UNITED STATES PATENT OFFICE.

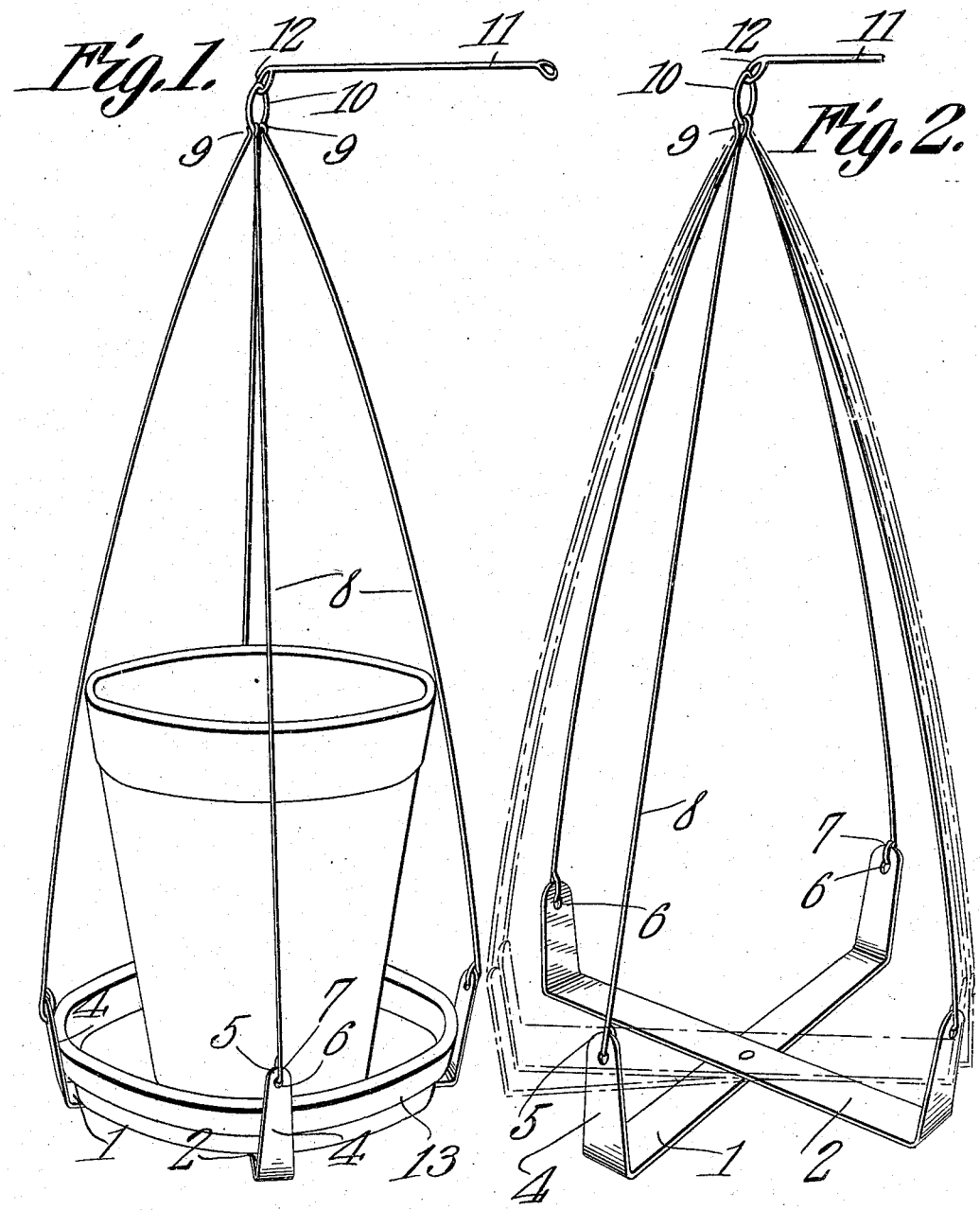

ARTHUR HAGLUND, OF LAWRENCE, KANSAS.

FLOWER-POT HOLDER.

941,448.

Specification of Letters Patent. Patented Nov. 30, 1909.

Application filed August 2, 1909. Serial No. 510,795.

*To all whom it may concern:*

Be it known that I, ARTHUR HAGLUND, a citizen of the United States, residing at Lawrence, in the county of Douglas and State of Kansas, have invented a new and useful Flower-Pot Holder, of which the following is a specification.

My invention relates to flower pot hangers and has for an object to provide a device of this character which can be adjusted to any flower pot, and will securely hold the flower pot when once adjusted thereto, firmly in position against the force of the strongest winds and storms.

Another object is to provide a device of this character which will have a relatively movable sectional base which can be manipulated to permit a new flower pot to be easily and readily inserted in place of a broken one, without removing the device from operative position.

A further object is to provide a device of this character having up-turned lugs which will hold the suspension wires from contact with the flower pot except at the top edge in order that the outer walls of the flower pot will not be discolored by any oxidation of the metal composing the suspension wires.

A still further object is to provide a device of this character which will securely hold the drip saucer in engagement with the flower pot.

In the usual form of flower pot hangers, great difficulty is experienced in obtaining an adjustable clamp that will securely hold the flower pot without bearing against or scratching the surface of the flower pot or unduly straining its outer walls.

My present invention overcomes this difficulty by the provision of a pair of flat relatively movable cross bars pivotally connected together intermediate the ends which are designed to extend at right angles to each other when in open or operative position and securely support the weight of a flower pot and plant without clamping the side walls or flange of the flower pot in any manner. Suspension wires are provided which bear upon the top edge of the flower pot at four points equally spaced from each other to so distribute the strain of clamping the flower pot in position that no one portion of the flower pot is unduly strained and consequently none of the fracturing or breaking out of small sections of the flower pot can occur as in the usual form of flower pot hangers.

With the above advantages and other objects in view, which will appear as the nature of the invention is better understood, my invention comprises the novel details of construction and combination of parts illustrated in the accompanying drawing, described in the following specification and set forth in the appended claims.

In the accompanying drawing,—Figure 1 is a perspective view of a flower pot showing a flower pot hanger constructed in accordance with my invention applied thereto. Fig. 2 is a perspective view of the flower pot hanger shown in unfolded or operative position and shown dotted in folded position to receive a flower pot.

In a more detailed description of my invention in which like characters of reference designate similar parts in the view shown, 1 and 2 designate cross bars pivotally connected together intermediate the ends by a suitable pivot pin as shown in Fig. 2.

The cross bars 1 and 2 may be made of any material but preferably from flat strips of metal which may be ornamented on one or both faces, if desired to give a neat and finished appearance to the same.

The ends of the cross bars are upturned to provide lugs 4 which are inclined outwardly and upwardly and terminate in rounded end edges 5 to provide a smooth facial contour for the cross bars so that there may be no projecting edges to tear or lacerate the hands in adjusting the device to a flower pot.

Formed in the upturned lugs 4 adjacent the end edges thereof are openings 6 to receive the terminal eyes 7 of the suspension wires 8.

The suspension wires 8 may be formed of cord, chains or similar material but preferably from resilient rods which may be easily and readily bent to conform to the contour of the upper edges of the flange of a flower pot so as not to chip or nick the peripheral edge of the supported flower pot.

Each of the suspension wires is provided with an eye or loop 9 intermediate its terminal eyes through which a ring 10 is passed to connect the wires at their middle points, as shown.

It is evident that the suspension wires will be drawn together at their middle points, the terminals radiating downward and bearing against the upper edge of the flange of the flower pot at equally distant points. In this manner, the strain of clamping the flower pot in position will be borne by the reinforced upper portion of the flower pot, while the entire weight of the flower pot and contents will be wholly supported by the intersecting cross bars underneath its bottom.

It may further be seen that the suspension wires are held spaced from the lateral side walls of the flower pot by the upstanding lugs, the particular advantage arising from this construction being that the outer surface of the flower pot will be preserved free from stains or iron-rust resulting from the oxidation of the metal composing the suspension wires.

For suspending the flower pot at any distance from a side wall, a hanger rod 11 is provided. The hanger rod terminates in eyes 12, one of which engages the supporting ring 10 and the other a hook, staple or similar connector, suitably secured to the side wall.

By referring to the drawing it will be seen that the drip saucer 13 is securely held in engagement with the flower pot and may be removed at any time therefrom without removing the flower pot from the hanger.

From the foregoing description taken in connection with the accompanying drawing, it is thought that the construction and operation of my invention will be easily understood without a more extended explanation, it being understood that various changes in the form, proportion and minor details of construction may be made without sacrificing any of the advantages or departing from the spirit of the invention.

What is claimed is:—

1. In a flower pot hanger, a pair of relatively movable bars pivotally connected intermediate their ends, a plurality of rods secured to the terminals of said movable bars, a ring suspending said rods, and a securing member connected at one end to said ring and terminating at the other in an eye for securing the device in operative position.

2. In a flower pot hanger, a pair of relatively movable bars pivotally connected together intermediate the ends and terminating at each end in upstanding projections, a plurality of resilient rods secured to said upstanding projections, a suspension ring loosely engaging said rods, and a securing member having an eye disposed at one end for engagement with said ring, and an eye at the opposite end for securing the device in operative position.

3. In a flower pot hanger, a pair of relatively movable bars pivotally connected together intermediate their ends, each of said bars terminating at its opposite ends in upwardly and outwardly inclined lugs, a plurality of resilient rods terminating at their lower ends in eyes for engagement with said lugs, a suspension ring connecting said rods, and a securing member having at one end an eye for engagement with said ring and at the other an eye for securing the device in operative position.

4. In a flower pot hanger, a pair of relatively movable cross bars pivotally connected together intermediate their ends, the end portions of each of said bars being upturned and provided with openings adjacent the upper end edges, a pair of resilient rods each terminating in eyes for engagement with the openings in the upturned end portions of said cross bars, a ring loosely engaging the resilient rods at their central portions, and a securing member having at one end an eye for engagement with said ring and at the other end an eye for securing the device in operative position.

5. In a flower pot hanger, a pair of cross bars having relatively horizontal movements, a pivot pin connecting the cross bars together intermediate their ends, each of said cross bars being turned up at its opposite ends to provide upstanding lugs adapted to retain a flower pot seated on said cross bars, said upturned ends being provided with openings adjacent their upper edges, a pair of resilient rods having terminal and intermediate eyes, the terminal eyes being engaged through the openings in the upturned ends of said cross bars, a ring loosely engaging said intermediate eyes whereby to connect the rods together, and a securing member having at one end an eye for engagement with said ring and at the other an eye for securing the device in operative position.

In testimony that I claim the foregoing as my own, I have hereto affixed my signature in the presence of two witnesses.

ARTHUR HAGLUND.

Witnesses:
EDW. T. RIEING,
MYRTLE McCONNELL.